Figure 1:
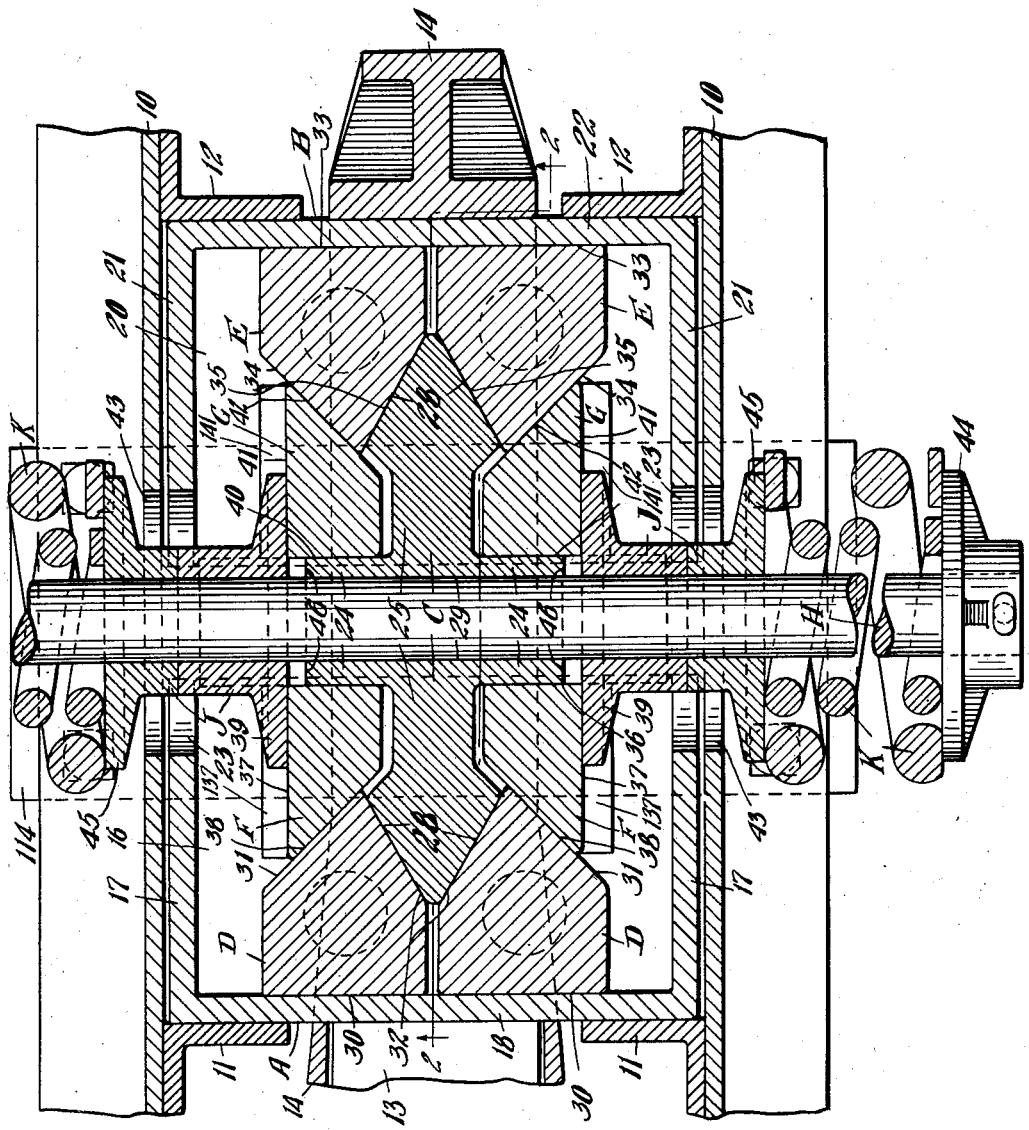

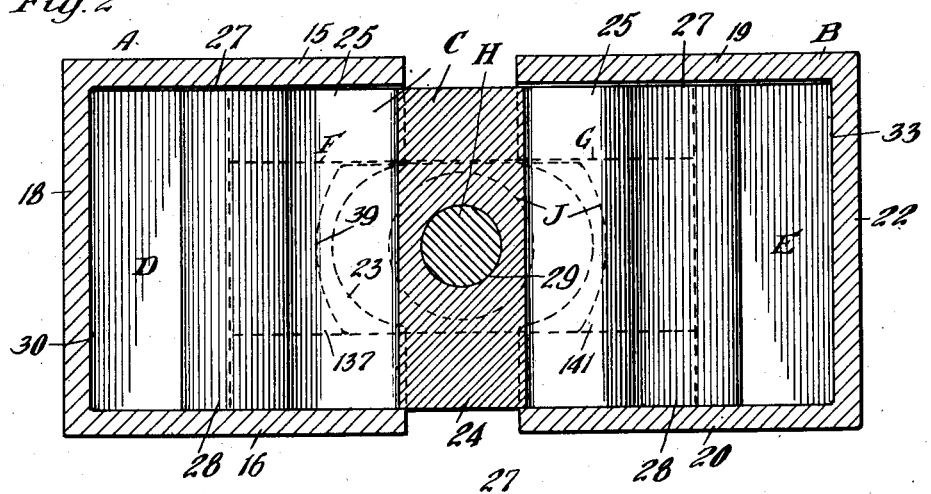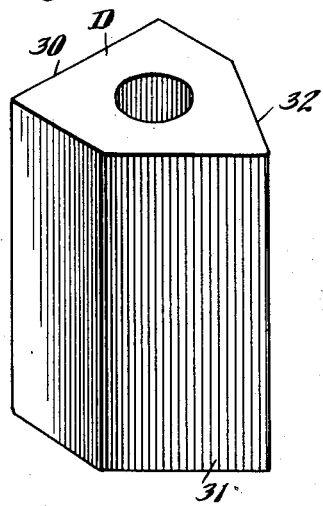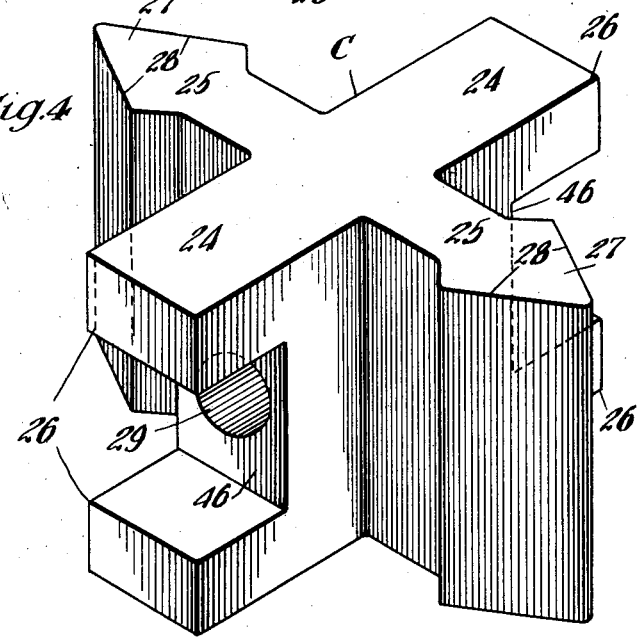

Patented Jan. 5, 1926.

1,568,614

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed April 25, 1923, Serial No. 634,424. Renewed May 25, 1925.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft rigging, which is of simple construction, easily manufactured, provided with large frictional areas and of high capacity.

A further object of the invention is to provide a mechanism of the type indicated including wedges, side friction-shoes and a central friction element, wherein the wedges and shoes are provided with co-acting wedge faces extending at relatively blunt and keen angles with reference to the line of direction of the actuating force, whereby easy and certain release of the mechanism is assured.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a vertical, transverse sectional view corresponding substantially to the line 2—2 of Figure 1. Figure 3 is a detail perspective view of one of the wedge blocks. And Figure 4 is a detail perspective view of the central friction member.

In said drawings, 10—10 denote channel draft sills of a railway car to the inner faces of which are secured front stop lugs 11—11 and rear stop lugs 12—12. The rear portion of the drawbar is indicated at 13, the same being operatively associated with the shock absorbing mechanism by a hooded yoke 14 attached thereto. The movable parts of the draft rigging are supported in operative position by a detached saddle plate 114.

The improved shock absorbing mechanism comprises, broadly, a front follower casing A; a rear follower casing B; a central friction element C; a pair of front wedge blocks D—D; a pair of rear wedge blocks E—E; a pair of front friction shoes F—F; a pair of rear friction shoes G—G; a bolt H; a pair of two-part spring followers or spools J—J; and a pair of spring resistance elements K—K.

The front and rear follower casings A and B are each of hollow box-like construction. The front follower casing A is provided with spaced top and bottom walls 15 and 16, spaced side walls 17—17, and a transversely extending, vertical, front end wall 18. The wall 18 is adapted to co-act with front stop lugs 11—11 in the usual manner. The follower casing B is provided with spaced top and bottom walls 19 and 20, spaced side walls 21—21 and a transversely extending, vertical, rear end wall 22 adapted to co-act with the rear stop lugs 12—12. The inner ends of the front and rear follower casings are normally spaced apart a proper distance to permit the desired compression movement of the mechanism, but are adapted to abut and act as stops when the gear is fully compressed, the force being thus transmitted directly through the followers to the stop lugs on the draft sills. As clearly shown in Figure 1, the inner ends of the side walls of the followers are recessed as indicated at 23 to accommodate the spools K and provide proper clearance for the same when the gear is fully compressed, so that the lateral outward movement of the spools will not be interfered with.

The central friction element C is of cruciform shape having alined extending arms 24 disposed transversely of the mechanism and oppositely extending alined arms 25 disposed longitudinally of the mechanism. The member C is of a height substantially equal to the distance between the top and bottom walls of the followers, the oppositely extending arms 25 being housed within the front and rear followers respectively, and the front and rear edges of the arms 24 being slightly overlapped by the inner edges of the ends of the top, bottom and side walls of the front and rear follower casings, respectively. At the outer ends, each of the arms 24 is provided with spaced lugs 26, extending transversely of the mechanism and adapted to embrace the flanges of the inner members of the two-part spools J, the inner faces of said lugs being flat to correspond with the co-acting flat outer edges of the spool flanges, as clearly shown in Figures 2 and 4. Each of the longitudinally extending arms 25 of the central friction member is provided with an integral wedge portion 27 of arrow-head shape. The wedge portions 27 are each provided with a pair of outwardly converging flat faces 28 extending at relatively keen angles with reference to the longitudinal axis of the mechanism. The element C is also provided with a central bore 29 extending transversely of the mechanism and adapted to receive the bolt H.

The wedges D associated with the front follower A are of like construction and are arranged on opposite sides of the mechanism. Each of the wedge blocks D is provided with a flat front face 30 adapted to co-act with the end wall 18 of the front follower for sliding movement thereon and a pair of inwardly converging flat wedge faces 31 and 32, the faces 31 being disposed at relatively blunt angles with reference to the longitudinal axis of the mechanism, and the faces 32 being inclined correspondingly to the faces 28 of the front wedge portion 27 of the central friction member C and adapted to co-act therewith.

The wedge blocks E associated with the rear follower B are of similar construction and similarly arranged to the front wedge blocks D. Each of the wedge blocks E is provided with a flat rear end face 33 adapted to co-act with the end wall 22 of the rear follower and a pair of inwardly converging wedge faces 34 and 35, the faces 34 being disposed at relatively blunt angles with reference to the longitudinal axis of the gear, and the faces 35 being correspondingly inclined to and adapted to co-act with the wedge faces 28 of the rear wedge portion 27 of the central friction wedge member C.

The front friction shoes F are of a height equal to that of the friction member C and are disposed on opposite sides of the forwardly projecting arm 25. The front friction elements F are of like construction each being provided with a flat rear end face 36, a flat side face 37 and a flat wedge face 38 at the forward end thereof, the side face 37 being recessed, as indicated at 137 to receive the flanged end 39 of the inner member of the adjacent two part spool J. The faces 36 of the shoes F are adapted to slide on and frictionally engage with the flat front faces of the arms 24, and the wedge faces 38 are adapted to co-act with the adjacent wedge faces 31 of the friction shoes F and are correspondingly inclined thereto.

The rear friction wedge-shoes G are also of a height equal to that of the friction element C and are of a construction similar to the front friction wedge-shoe F, each being provided with a flat front end face 40, a flat side face 41 and a flat wedge face 42 at the front end thereof, the side face 41 being recessed as indicated at 141 to receive the flange 39 of the adjacent spool J. The faces 40 of the wedge shoes G are adapted to co-act with the flat rear faces of the arms 24 in a manner similar to the flat rear faces 36 of the wedge friction-shoes F, and the wedge faces 42 are adapted to coact with the wedge faces 34 of the rear wedges E and are correspondingly inclined thereto.

The bolt H extends transversely through the mechanism being received in the bore 29 of the member C and projecting through relatively large openings 43 in the draft sills 10 and extending outwardly beyond the draft sills.

Relative lateral separating movement of the wedge shoes F—F and G—G is opposed by the spring resistance elements K at opposite sides of the mechanism. Each of the spring resistance elements K is interposed between a flanged collar 44 fixed to one end of the bolt H and the flange 45 of the outer member of the adjacent two-part spool J. In Figure 1 of the drawing only one of the collars 44 is shown, the bolt H being broken away at the upper end of that figure to better accommodate the view to the sheet of drawing. The spools J are slidably movable on the bolt H and the flange 39 of the inner member of each spool is embraced by and works between the lugs 26 at the end of the adjacent arm 24 of the central friction wedging member. As clearly shown in Figure 1 wherein the parts are illustrated in fully released position, a space is left between the flanges 39 of the spools and the adjacent ends 46 of the element C, to compensate for wear of the friction and wedge faces of the mechanism.

Assuming an inward or buffing movement of the drawbar, the operation is as follows. The wedges D will be moved inwardly with the front follower toward the combined friction element C and the rear wedges E, the wedge faces 28 on the front and rear ends of the arms 25 of the element C forcing the wedges D and E apart, it being understood that the element C will be moved rearwardly with the wedge blocks D during the wedging action, but at a slower rate, thereby forcing the wedges E apart. At the same time the wedge blocks F and G will be separated laterally due to the wedging action of the wedge faces 31 and 34 of the wedges and the faces 38 and 42 of the shoes and the lateral outward movement of the wedges D and E, thereby compressing the springs K. During the separating movement of the wedge blocks D and E and the shoes F and G, friction will be created between the wedge blocks and the end walls of the follower upon which the wedges slide laterally, and between the shoes and the friction element C, the friction faces 36 and 40 of the shoes being pressed against the front and rear friction faces of the element C by the wedging action. The friction thus created will be in addition to that had between the wedge faces of the wedges, shoes and central friction element C. The inward movement of the follower A will be arrested upon engagement of the inner ends of the top, bottom and side walls thereof with the inner ends of the corresponding walls of the rear follower B, the parts being so proportioned that this will occur before the springs K have been driven solid. It will be evident that when the followers abut, the force is transmitted directly through the same to the stop lugs.

During draft the action will be the reverse of that just described, the rear wedges E being moved forwardly with the follower B, the front follower A and the wedges D being held stationary.

In release, due to the more acute angle obtaining between the co-acting wedge faces of the wedge shoes and wedges with respect to the inwardly directed reactive forces of the springs than obtains with respect to the wedges faces of the central element C and the wedges, the intial action will be a movement of the wedge shoes F and G on the wedges D and E, forcing the latter outwardly and freeing the wedge faces 32 and 35 of the shoes from the wedge faces 28 of the central element C, whereupon the springs will act to restore all of the parts to normal position. Any tendency of the wedge faces of the central wedge element C and wedges to stick, will be thus effectively overcome, and quick and certain release of the mechanism assured.

It will be evident that the angularity of the keen and blunt wedge faces of the wedges and shoes may be varied within certain limits and yet accomplish the desired result, the same having preferably, however, an angularity of 30 and 45 degrees, respectively, with reference to the longitudinal axis of the mechanism.

It will be evident from the preceding description that I have provided a highly efficient gear of simple construction in which quick release is assured, because of the blunt angles which first come into action, thereby making the releasing operation more certain than heretofore in mechanism of this general class.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with end followers movable relatively toward each other; of end wedges movable with the respective followers; a central friction element having wedge faces at the front and rear ends thereof and friction faces extending transversely of the mechanism; a plurality of wedge friction shoes co-acting with said wedges, said friction shoes being transversely slidable on the friction faces of said central element; and spring elements arranged to resist movement of said shoes.

2. In a friction shock absorbing mechanism, the combination with end followers movable relatively toward and from each other; of end wedges movable with the respective followers; a central friction element said element and wedges having co-acting wedge faces; a plurality of friction wedge shoes, said shoes being transversely separable, said shoes and wedges having co-acting wedge faces and said shoes and friction element having co-acting friction faces; and means for yieldingly resisting movement of said shoes.

3. In a friction shock absorbing mechanism, the combination with end followers movable relatively toward each other; of wedges movable with the respective followers; a central friction element, said element and wedges having co-acting wedge faces extending at a relatively keen angle with reference to the longitudinal axis of the mechanism; a plurality of friction wedge shoes, said shoes being transversely separable, said shoes and wedges having co-acting wedge faces extending at a relatively blunt angle with reference to said axis, and said wedge shoes and friction element having co-acting friction faces; and means for yieldingly resisting movement of said shoes.

4. In a friction shock absorbing mechanism, the combination with end followers movable relatively toward each other; of end wedges movable with the respective followers, said wedges being transversely slidable on said followers; a central friction element having transversely extending friction surfaces, said element and wedges having co-acting wedge faces extending at a relatively keen angle with respect to the longitudinal axis of the mechanism; a plurality of friction shoes transversely separable and slidable on the friction faces of said element, said shoes and wedges having co-acting wedge faces extending at relatively blunt angles with reference to the longitudinal axis of the mechanism; and yielding means arranged to resist movement of said shoes.

5. In a friction shock absorbing mechanism, the combination with end followers movable relatively toward each other; of end wedges movable with the respective followers, each of said wedges having a pair of wedge faces extending respectively at blunt and keen angles with reference to the longitudinal axis of the mechanism; a central friction element having a plurality of friction faces and a plurality of wedge faces, each of the wedge faces of said element being correspondingly inclined to and adapted to co-act with one of the pairs of faces of one of said wedges; a plurality of transversely separable friction wedge shoes, each of said shoes having a friction face co-acting with one of the friction faces of said element and a wedge face, the wedge face of said shoes being correspondingly inclined to and co-acting with the remaining faces of said wedge shoes; and means for yieldingly resisting movement of said shoes.

6. In a friction shock absorbing mechanism, the combination with front and rear follower shells movable toward each other; of pairs of front and rear end wedges movable relatively toward each other with the respective followers, and movable laterally of the followers, said wedges and followers having co-acting friction faces; front and rear friction shoes co-acting with said wedges, said shoes being separable transversely of the mechanism; a central friction element provided with transversely extending friction surfaces co-acting with said front and rear friction shoes, said element also having wedge faces at its front and rear sides co-acting with said front and rear wedges; and spring elements arranged to resist movement of said friction shoes.

7. In a friction shock absorbing mechanism, the combination with front and rear followers; of a pair of end wedges movable with each of said respective followers, each of said end wedges being provided with a wedge face extending at a relatively keen angle with reference to the longitudinal axis of the gear and a wedge face extending at a relatively blunt angle with reference to said axis; a central friction element having lateral friction surfaces, and forwardly and rearwardly extending wedge members formed integral therewith said wedge members being adapted to co-act with the keen wedge faces of said wedges; two pairs of friction shoes having friction faces co-acting with the friction element and wedge faces correspondingly inclined to the blunt wedge faces of said wedges and co-acting therewith, said pairs of shoes being disposed on opposite sides of the mechanism and the shoes composing each pair being disposed respectively in front of and to the rear of said element; and spring elements arranged to resist movement of said shoes.

8. In a friction shock absorbing mechanism, the combination with front and rear followers movable relatively toward each other; of pairs of front and rear wedges movable with the respective followers and transversely thereto; a centrally disposed friction element having transversely extending front and rear friction faces, and longitudinally extending forwardly and rearwardly projecting arms, said arms and wedges having co-acting wedge faces extending at relatively keen angles with reference to the longitudinal axis of the mechanism; a plurality of laterally separable friction shoes arranged in pairs disposed at the opposite sides of the mechanism, said shoes having friction faces coacting with the front and rear friction faces of said element, and said shoes and front and rear wedges having co-operating wedge faces extending at relatively blunt angles with reference to said axis; and means for yieldingly resisting the lateral movement of said shoes.

9. In a friction shock absorbing mechanism, the combination with end followers, movable relatively toward each other; of end wedges movable with the respective followers; a central friction element provided with friction surfaces and wedge faces, said wedge faces being disposed at the front and rear ends of said element; a plurality of wedge friction shoes co-acting with said wedges, said shoes being relatively separable and slidable on the friction faces of said central element; and spring elements arranged to resist movement of said shoes.

10. In a friction shock absorbing mechanism, the combination with end followers movable relatively toward each other; of end wedges movable with and slidable on said followers; a central friction element provided with lateral friction surfaces, and integral relatively keen angled wedge elements; a plurality of friction shoes separable in a direction at right angles to the axis of the mechanism and slidable on said element, said shoes and wedges having relatively blunt co-acting wedge faces; and yielding means arranged to resist movement of said shoes.

11. In a friction shock absorbing mechanism, the combination with front and rear followers; of a pair of end wedges movable with each of said followers, each of said wedges being provided with a wedge face extending at a relatively keen angle with reference to the longitudinal axis of the mechanism, and a wedge face extending at a relatively blunt angle with reference to said axis; a central friction element having lateral friction surfaces, and forwardly and rearwardly extending wedge members formed integral therewith said wedge members being adapted to co-act with the keen wedge faces of said wedges; two pairs of friction shoes having friction faces co-acting with the friction element and wedge faces correspondingly inclined to the blunt wedge faces of said wedges and co-acting therewith, said pairs of shoes being separable at right angles to the axis of the mechanism, and the shoes comprising each pair being disposed respectively in front of and to the rear of said element; and spring elements arranged to resist relative movement of said shoes.

12. In a friction shock absorbing mechanism, the combination with end followers movable relatively toward and from each other; of a rigid friction element interposed between said followers; wedge means associated with said followers and co-operating with said friction element; a plurality of friction shoes co-acting with said wedge means, said shoes and friction element having co-acting friction surfaces disposed transversely of the mechanism; and spring means resisting movement of said shoes with reference to said friction element.

In witness that I claim the foregoing I have hereunto subscribed my name this 23rd day of April 1923.

JOHN F. O'CONNOR.